(12) United States Patent
de la Iglesia

(10) Patent No.: US 8,635,416 B1
(45) Date of Patent: Jan. 21, 2014

(54) APPARATUS, METHOD AND SYSTEM FOR USING SHADOW DRIVES FOR ALTERNATIVE DRIVE COMMANDS

(75) Inventor: Erik de la Iglesia, Sunnyvale, CA (US)

(73) Assignee: Violin Memory Inc., Santa Clara, CA (US)

( * ) Notice: Subject to any disclaimer, the term of this patent is extended or adjusted under 35 U.S.C. 154(b) by 252 days.

(21) Appl. No.: 13/039,162

(22) Filed: Mar. 2, 2011

(51) Int. Cl.
*G06F 12/00* (2006.01)

(52) U.S. Cl.
USPC ............................................. 711/154; 711/4

(58) Field of Classification Search
USPC ..................................................... 711/154, 4
See application file for complete search history.

(56) References Cited

U.S. PATENT DOCUMENTS

| | | | |
|---|---|---|---|
| 5,954,796 A | 9/1999 | McCarthy et al. |
| 6,041,366 A | 3/2000 | Maddalozzo et al. |
| 6,401,147 B1 | 6/2002 | Sang et al. |
| 6,636,982 B1 | 10/2003 | Rowlands |
| 6,678,795 B1 | 1/2004 | Moreno et al. |
| 6,721,870 B1 | 4/2004 | Yochai et al. |
| 6,742,084 B1 | 5/2004 | Defouw et al. |
| 6,789,171 B2 | 9/2004 | Desai et al. |
| 6,810,470 B1 | 10/2004 | Wiseman et al. |
| 7,017,084 B2 | 3/2006 | Ng et al. |
| 7,089,370 B2 | 8/2006 | Luick |
| 7,110,359 B1 | 9/2006 | Acharya |
| 7,856,533 B2 | 12/2010 | Hur et al. |
| 7,870,351 B2 | 1/2011 | Resnick |
| 7,873,619 B1 | 1/2011 | Faibish et al. |
| 7,975,108 B1 | 7/2011 | Holscher et al. |
| 8,010,485 B1 | 8/2011 | Chatterjee et al. |
| 2002/0035655 A1 | 3/2002 | Finn et al. |
| 2002/0175998 A1 | 11/2002 | Hoang |
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2005/0278529 A1 * | 12/2005 | Kano ............................ 713/168 |
| 2006/0005074 A1 | 1/2006 | Yanai et al. |

(Continued)

OTHER PUBLICATIONS

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

(Continued)

*Primary Examiner* — Jared Rutz
(74) *Attorney, Agent, or Firm* — Brinks Gilson and Lione

(57) ABSTRACT

A storage processor is configured to identify a first disk drive and a second shadow drive associated with the first disk drive to an initiator. The storage processor receives storage commands from an initiator. When the storage commands access the first disk drive, the storage processor issues a first storage operation to the first disk drive. When the storage commands access the second shadow drive, the storage processor issues different storage operations to the first disk drive that are not supported by the initiator.

22 Claims, 6 Drawing Sheets

(56) References Cited

U.S. PATENT DOCUMENTS

| | | | |
|---|---|---|---|
| 2006/0034302 A1 | 2/2006 | Peterson | |
| 2006/0053263 A1 | 3/2006 | Prahlad et al. | |
| 2006/0075191 A1 | 4/2006 | Lolayekar et al. | |
| 2006/0112232 A1 | 5/2006 | Zohar et al. | |
| 2006/0212524 A1 | 9/2006 | Wu et al. | |
| 2006/0218389 A1 | 9/2006 | Li et al. | |
| 2006/0242377 A1* | 10/2006 | Kanie et al. | 711/165 |
| 2006/0277329 A1 | 12/2006 | Paulson et al. | |
| 2007/0050538 A1* | 3/2007 | Northcutt et al. | 711/112 |
| 2007/0050548 A1 | 3/2007 | Bali et al. | |
| 2007/0079105 A1 | 4/2007 | Thompson | |
| 2007/0118710 A1 | 5/2007 | Yamakawa et al. | |
| 2007/0124407 A1 | 5/2007 | Weber et al. | |
| 2007/0192444 A1 | 8/2007 | Ackaouy et al. | |
| 2007/0233700 A1 | 10/2007 | Tomonaga | |
| 2007/0283086 A1 | 12/2007 | Bates | |
| 2008/0028162 A1 | 1/2008 | Thompson | |
| 2008/0098173 A1 | 4/2008 | Chidambaran et al. | |
| 2008/0104363 A1 | 5/2008 | Raj et al. | |
| 2008/0126584 A1* | 5/2008 | Mullis et al. | 710/7 |
| 2008/0162864 A1 | 7/2008 | Sugumar et al. | |
| 2008/0215827 A1 | 9/2008 | Pepper | |
| 2008/0215834 A1 | 9/2008 | Dumitru et al. | |
| 2008/0250195 A1 | 10/2008 | Chow et al. | |
| 2008/0320269 A1 | 12/2008 | Houlihan et al. | |
| 2009/0006725 A1 | 1/2009 | Ito et al. | |
| 2009/0006745 A1 | 1/2009 | Cavallo et al. | |
| 2009/0034377 A1 | 2/2009 | English et al. | |
| 2009/0110000 A1 | 4/2009 | Brorup | |
| 2009/0138665 A1* | 5/2009 | Suzuki | 711/147 |
| 2009/0240873 A1 | 9/2009 | Yu et al. | |
| 2009/0259800 A1 | 10/2009 | Kilzer et al. | |
| 2009/0262741 A1 | 10/2009 | Jungck et al. | |
| 2009/0276588 A1 | 11/2009 | Murase | |
| 2009/0307388 A1 | 12/2009 | Tchapda | |
| 2010/0011154 A1 | 1/2010 | Yeh | |
| 2010/0030809 A1 | 2/2010 | Nath | |
| 2010/0080237 A1 | 4/2010 | Dai et al. | |
| 2010/0088469 A1 | 4/2010 | Motonaga et al. | |
| 2010/0115206 A1 | 5/2010 | de la Iglesia et al. | |
| 2010/0115211 A1 | 5/2010 | de la Iglesia et al. | |
| 2010/0122020 A1 | 5/2010 | Sikdar et al. | |
| 2010/0125857 A1 | 5/2010 | Dommeti et al. | |
| 2010/0169544 A1 | 7/2010 | Eom et al. | |
| 2010/0174939 A1 | 7/2010 | Vexler | |
| 2011/0047347 A1 | 2/2011 | Li et al. | |
| 2011/0258362 A1 | 10/2011 | McLaren et al. | |
| 2012/0198176 A1 | 8/2012 | Hooker et al. | |

OTHER PUBLICATIONS

Rosenblum, Mendel and Ousterhout, John K., The LFS Storage Manager. Proceedings of the 1990 Summer Usenix. 1990 pp. 315-324.

Stolowitz Ford Cowger Listing of Related Cases, Feb. 7, 2012.

* cited by examiner

| | Command | Target | Operation |
|---|---|---|---|
| 352 | Read | SSD Drive | Read data from SSD drive |
| 354 | Write | SSD Drive | Write data from SSD drive |
| 356 | Read | Shadow | No effect or read from SSD drive |
| 358 | Write | Shadow | Execute Trim from shadow device |

FIG. 4

APPARATUS, METHOD AND SYSTEM FOR USING SHADOW DRIVES FOR ALTERNATIVE DRIVE COMMANDS

BACKGROUND

A write operation to a rotating disk drive writes to a physical location on the disk. In other words, there is a one-to-one mapping between the received address and the physical address on the disk. Solid state drives (SSDs) may have an indirection table that creates a virtual address space for the received storage operations. The indirection table maps the addresses for the received storage commands to the virtual addresses assigned to the data by the SSD.

The SSD may use a scratch storage area to remap data from one location to another. The larger the available scratch storage area, the more efficient the SSD is in remapping data to different locations. The storage device manufacturer or enterprise user may wish to reserve some percentage of Flash memory in the SSD drive for these scratch operations. For example, the SSD may be able to perform larger data block transfers in a shorter amount of time when a larger scratch storage area is reserved.

Once a storage area in the SSD is used for storing data, it may no longer be available for the scratch storage operations, even if the storage area is never used again for storing data. For example, some storage systems only support read and write operations and have no way to invalidate or "free up" previously used address space.

Some SSD drives provide a trim command that can invalidate data in previously written to address spaces. However, the trim command is only supported by certain combinations of operating systems and file management systems, such as those used with the Microsoft® Windows® operating system. As mentioned above, other operating systems do not support the trim command and can only issue read and write operations. Even within operating systems that do support the trim command, the trim commands are controlled by that operating system, not by the applications originating the storage operations. Thus, unused or underutilized storage space may unnecessarily reduce the available scratch space in a SSD drive and thus reduce overall drive efficiency

BRIEF DESCRIPTION OF THE DRAWINGS

FIG. 4 depicts an example of a command table showing different disk drive operations performed in response to read and write commands.

DETAILED DESCRIPTION

Figure 1:
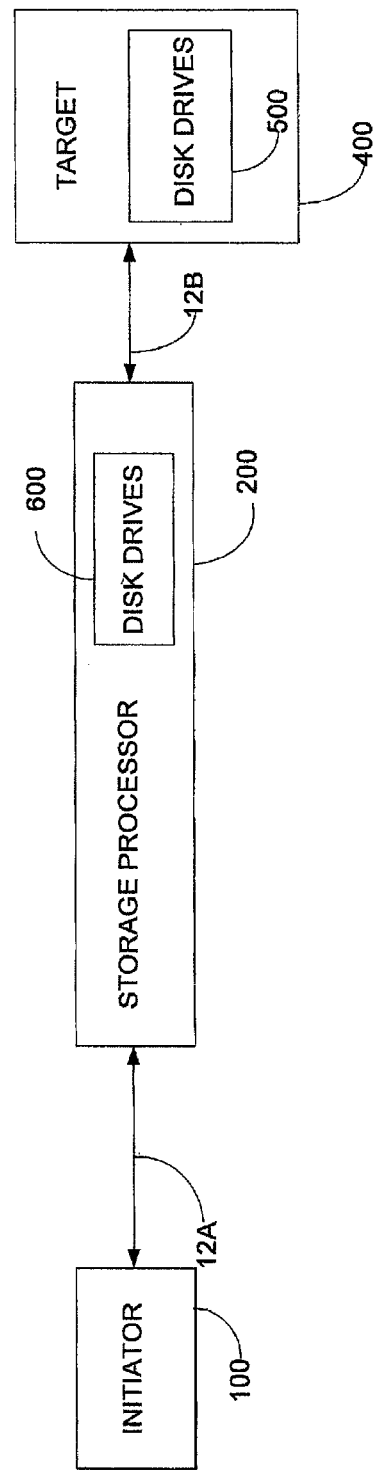
FIG. 1 depicts an example of a storage processor.

FIG. 1 shows a storage processor 200 deployed between an initiator 100 and a target 400. The initiator 100, storage processor 200, and/or target 400 may be directly connected together, or connected to each other through a network or fabric. Only one initiator 100 and one target 400 are shown in FIG. 1 for explanation purposes. However, it should be understood that multiple initiators 100 and multiple targets 400 may be connected through storage processor 200. Such multiple connections may be direct, routed, or switched depending on the physical interface type and transport protocol.

The initiator 100 may be any device or application that writes and/or reads data to and from another device. For example, the initiator 100 may comprise one or more servers, server applications, database applications, routers, switches, client computers, personal computers, Personal Digital Assistants (PDA), smart phones, or any other wired or wireless computing device and/or software that accesses data in target 400 or disk drives 600.

In another example, the initiator 100 may comprise a stand-alone appliance, device, or blade, and the target 400 may comprise a stand-alone storage array of disk drives 500. In yet another example, the initiator 100 may be a processor or software application in a computer that accesses target 400 over an internal or external data bus.

Target 400 may be any device that stores data accessed by another device, application, software, initiator, or the like, or any combination thereof. Target 400 may be located in a personal computer or server, or may be a stand-alone device coupled to the initiator 100 via a computer bus or packet switched network connection.

In one example, the target 400 may comprise storage devices or storage servers that contain storage media such as solid state memory, rotating disk drives, solid state drives (SSD) or the like, or any combination thereof. For example, target 400 may contain multiple disk drives 500 that may exist locally within the same physical enclosure as storage processor 200, within a same enclosure with other targets 400, or exist externally in a chassis connected to target 400 and/or storage processor 200 through an interconnect mechanism.

In one example, the initiator 100, storage processor 200, and/or target 400 are coupled to each other via wired or wireless connections 12A and 12B. Different communication protocols can be used over connection 12A between initiator 100 and storage processor 200 and connection 12B between storage processor 200 and target 400. Example protocols may include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE), or the like, or any combination thereof.

Storage processor 200 may be any combination of hardware and/or software located in a storage appliance, wireless or wired router, server, gateway, firewall, switch, computer processing system, rate adapter, host bus adapter (HBA), chip on a motherboard, a piece of logic located in an integrated circuit, or the like, or any combination thereof. The initiator 100 may issue storage commands to the disk drives 500 in target 400 through the storage processor 200. The storage commands may include write commands and read commands that have associated storage addresses. The storage commands may be normalized by the storage processor 200 into block-level commands such as "reads" and "writes" of an arbitrary number of blocks.

Storage processor 200 may include disk drives 600 configured to accelerate storage accesses to disk drives 500. For example, the disk drives 600 may be used as a cache and/or tiering media for storing copies of data contained in disk drives 500. However, disk drives 600 may be used for any operation where storage processor 200 may want to access an alternative storage media.

Examples of how disk drives 600 may be used as a cache and/or tiering media are described in the following co-pending patent applications which are all herein incorporated by reference in their entirety: U.S. patent application Ser. No. 12/889,732 filed on Sep. 24, 2010; U.S. patent application Ser. No. 12/814,438 filed on Jun. 12, 2010; U.S. patent application Ser. No. 12/605,119 filed on Oct. 23, 2009; U.S. patent application Ser. No. 12/605,160 filed Oct. 23, 2009; and U.S. patent application Ser. No. 12/684,387 filed Jan. 8, 2010 which are all herein incorporated by reference in their entirety.

Figure 2:
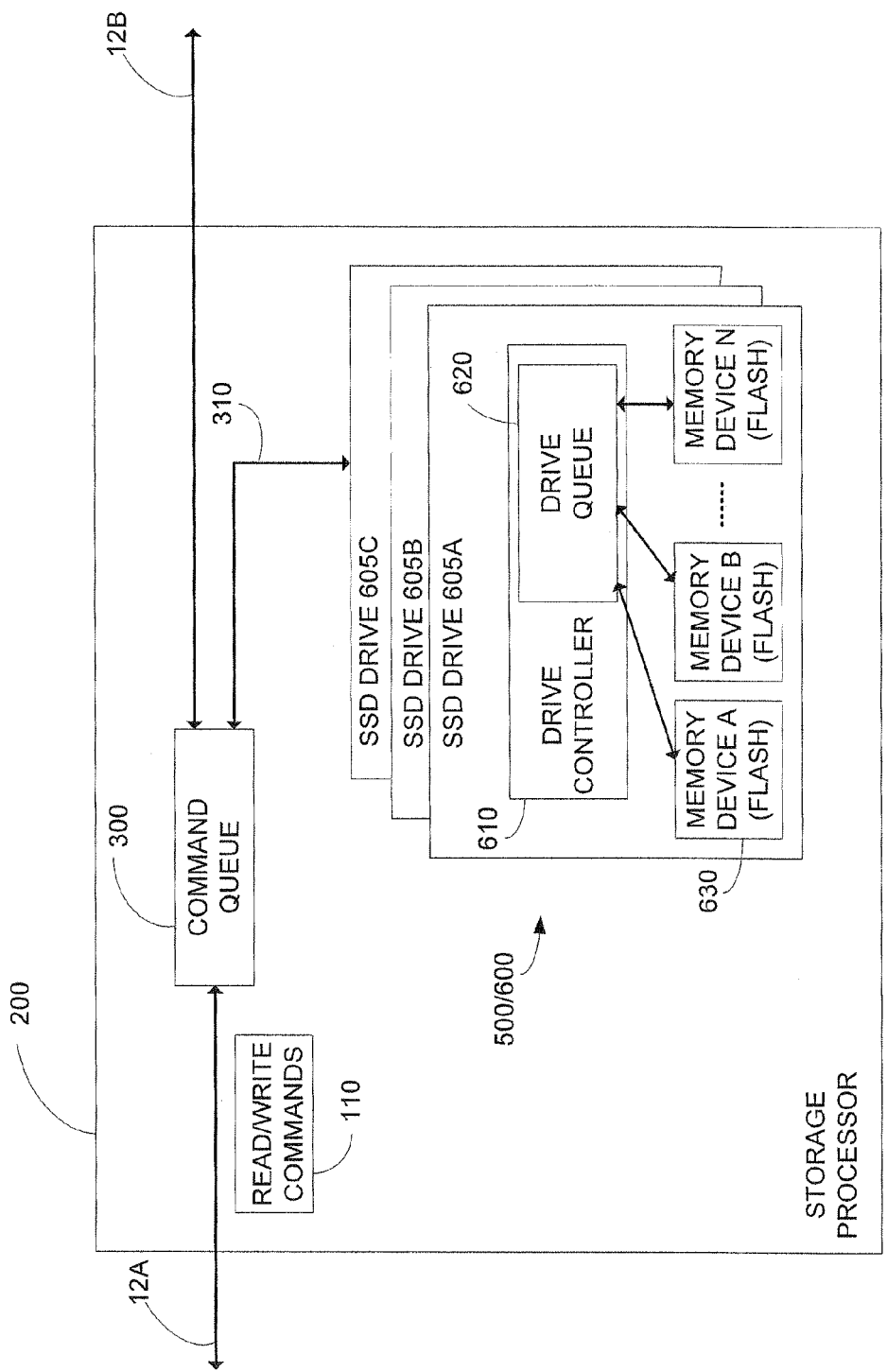
FIG. 2 depicts an example of the storage processor of FIG. 1 in more detail.

FIG. 2 depicts an example of the storage processor 200 of FIG. 1 in more detail. A command queue 300 receives storage commands 110 from initiator 100 directed to target 400. For example, the storage commands 110 may comprise read or write operations. In one example, the disk drives 600 and/or 500 may comprise multiple solid state drives (SSD) 605A-605C each including multiple simultaneously accessible memory devices 630. In one example, memory devices 630 may comprise Flash memory, but other types of memory, such random access memory (RAM) or other solid state memory may also be used. In one example, other rotating storage media may also be used in disk drives 500 or 600 in combination with SSD drives 605.

In one example, the disk drives 605 include a drive controller 610 that uses a drive queue 620 to manage the dispatch and ordering of storage commands 110 received from storage processor 200. In one example, the drive controller 610 may be implemented using an application specific integrated circuit (ASIC), however, other types of logic circuitry may also be used. In another example, drive controller 620 may be software executing within a processor, ASIC or other circuitry or device.

Drive controller 610 may access the different memory devices 630 for different storage commands 110. For example, drive controller 610 may stripe data over different combinations of memory devices 630 based on the amount of data associated with the storage commands 110. As a result, data associated with a first storage command 110 may be stored over multiple memory devices A-C, data associated with a second storage command 110 may only be stored in memory device A, and data associated with a third storage command 110 may be stored in memory device B.

The disk drives 500 in target 400 may have a similar structure as the disks drives 600 shown in FIG. 2. For example, the disk drives 500 may include multiple SSD drives 605 each having multiple concurrently accessible memory devices 630. Any operations described below may apply either to the SSD drives 605 in disk drives 500 of target 400 and/or the SSD drives 605 in disk drives 600 of storage processor 200.

Command queue 300 may be associated with the disk drives 500 in target 400, the disk drives 600 in storage processor 200, or may include one set of command queues for disk drives 500 and a second set of command queues for disk drives 600.

Storage processor 200 may receive a storage command 110 in command queue 300 from initiator 100. Storage processor 200 may send the storage command 110 over connection 310 to disk drives 600 when the address associated with the storage command 110 contains an address for data contained in disk drives 600. When the address does not match an address associated with data in disk drives 600, storage processor 200 may forward the storage command 110 in command queue 300 over connection 12B to disk drives 500.

Storage processor 200 creates shadow SSD drives and uses accesses to the shadow drives to conduct operations not supported by the initiators. For example, the storage processor 200 may interpret accesses to the shadow drives as requests for trim operations that invalidate address locations in the corresponding physical drives 605. These trimming operations free up additional scratch space in the SSD drives 605 that can then be used by the drive controller 610 to more efficiently manage storage space and improve overall performance of disk drives 500 and/or disk drives 600.

Existing applications would require logical changes to utilize the trim operation and function. However, such application changes would not function unless the operating system itself supported the trim function. It is therefore advantageous to support the logical functionality of the trim operation without deviating from the universally supported read and write command model of the operating system. The system below allows for applications to utilize trim without explicit operating system support.

Figure 3:
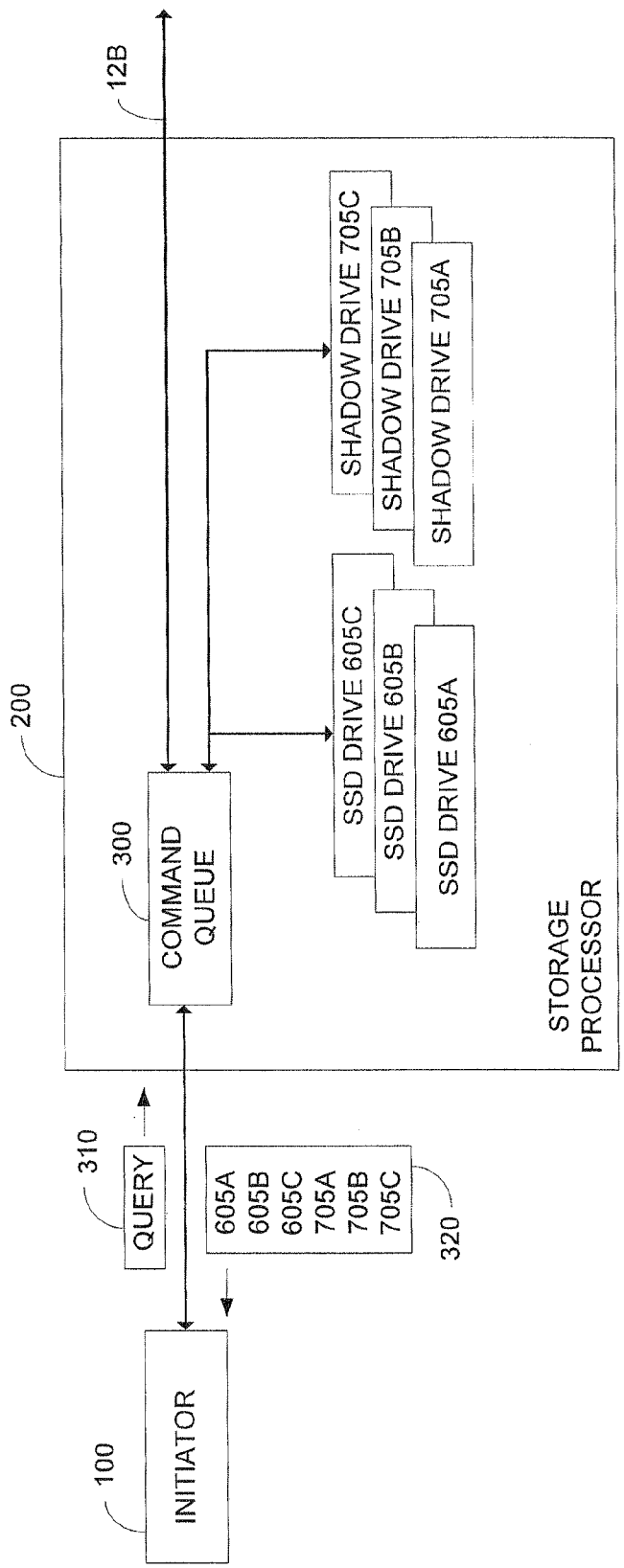
FIG. 3 depicts an example of shadow drives identified by the storage processor of FIG. 1.

FIG. 3 depicts an example of how the storage processor 200 creates shadow drives 705. In one example, the initiator 100 sends a query 310 during system initialization, booting, or any other operation where target drives need to be identified. For example, the initiator 100 may send out the query 310 to identify the disks attached to the same fiber channel in accordance with the SCSI protocol or to identify the disks attached to the same SATA channel using the ATA protocol. The choice of attachment method (Fibre Channel, SATA, SAS, etc) and underlying storage protocol (SCSI or SATA) is depends on the implementation.

Normally, the storage processor 200 would respond back to the query 310 from initiator 100 by identifying the SSD drives 605A, 605B, and 605C that are actually physically attached to storage processor 200. However, with the utilization of the present system, storage processor 200 provides a response 320 that identifies both the three actual physical drives 605A, 605B, and 605C and three shadow drives 705A, 705B, and 705C.

Addressing shadow drives 705 allows the initiator 100 to initiate alternative commands to the physical drives 605.

The three shadow drives 705A, 705B, and 705C are identified as having the same attributes as corresponding SSD drives 605A, 605B, and 605C, respectively. For example, if SSD drive 605A is a 160 gigabyte drive, shadow drive 705A may also be identified as a 160 gigabyte drive. It should also be noted that in at least one example, the same protocol previously used for identifying physical SSD drives 605 is also used for identifying the associated shadow drives 705. The only difference is that the shadow drives 705 are virtual drives and the initiator 100 knows which drives identified by the storage processor 200 are actual physical drives 605 and which drives are associated virtual shadow drives 705.

Any scheme can be used for associating or mapping a shadow/virtual drive 705 with an actual physical drive 605. For example, the storage processor 200 may enumerate the set of physical drives 605 on a first bus segment and enumerate the second set of shadow drives 705 on a second bus segment. In this example, the SSD drive 605A and the associated shadow drive 705A may be assigned a same drive number by the storage processor 200 but assigned to different bus segments, such as on a SCSI bus.

In an alternate embodiment, the first set of physical drives 605A, 605B, and 605C may be identified by the storage processor 200 using even drive identifier values and the second set of shadow drives 705A, 705B, and 705C may be identified by the storage processor 200 using odd drive identifier values. For example, the shadow drive 705A may be assigned a drive identifier value of 1 and the associated physical drive 605A may be assigned a drive identifier value of zero. Similarly, the shadow drive 705B may be assigned a drive identifier value of 3 and the associated physical drive 605B may be assigned a drive identifier value of 2.

Of course any other type of indexing or mapping may be used to associate the shadow drives 705 with the physical drives 605. In yet another example, the first 32 drive numbers may be associated with physical drives 605 and the second 32 drive numbers may be associated with the shadow drives 705. For example, a first one of the first 32 SSD drive numbers may associated with physical drive 605A and a first one of the second 32 shadow drive numbers may be associated with shadow drive 705A and therefore linked to associated physical drive 605A.

FIG. 4 depicts a table 350 showing how different read and write commands are mapped to different operations by storage processor 200. A read command 352 addressed to a physical drive 605 is performed in a same way as previous read commands. For example, the storage processor 200 initiates a read operation on the physical drive 605 at the address identified in the read command 352. A write command 354 addressed to a physical drive 605 is performed in a same way as conventional write commands where the storage processor 200 initiates a write operation to the physical drive 605 at the address identified in the write command 354.

In one example, a read command 356 addressed to a shadow drive 705 will perform a no-op. For example, the storage processor 200 will not initiate any read or write operation to the physical drive 605 when the read command 356 is received. In another example, the read command 356 to the shadow drive 705 may cause the storage processor 200 to initiate an alternative storage operation. For example, the read command 356 may cause the storage processor 200 to conduct a cache pre-load or pre-read operation. In another example, the read command 356 may cause the storage processor 200 to read data from a rotating disk drive and store the data into a solid state memory. In yet another example, the read command 356 may cause the storage processor 200 to read or identify performance metrics or other information from the physical drive 605.

In one example, a write command 358 to a shadow drive 705 causes the storage processor 200 to execute a trim operation in the associated physical drive 605. For example, the storage processor 200 may invalidate data in the physical drive 605 at the address identified in the write command 358. In this example, the storage processor 200 determines the write command 358 is directed to one of the shadow drives 705, identifies the associated physical drive 605, and then sends a trim command to the associated physical drive 605 that invalidates the particular block address range identified in the write command 358.

Any commands supported by the SSD drives 605 may be initiated by the storage processor 200 in response to receiving a shadow read command 356 or shadow write command 358. For example, a write command 358 addressed to a first set of shadow drives 705 may cause the storage processor 200 to issue the trim command referenced above. A write command 358 addressed to a second set of shadow drives 705 may cause the storage processor 200 to conduct a pre-load operation, maintenance operation, or any other operation or command that may be supported by the physical drives 605.

Figure 5:
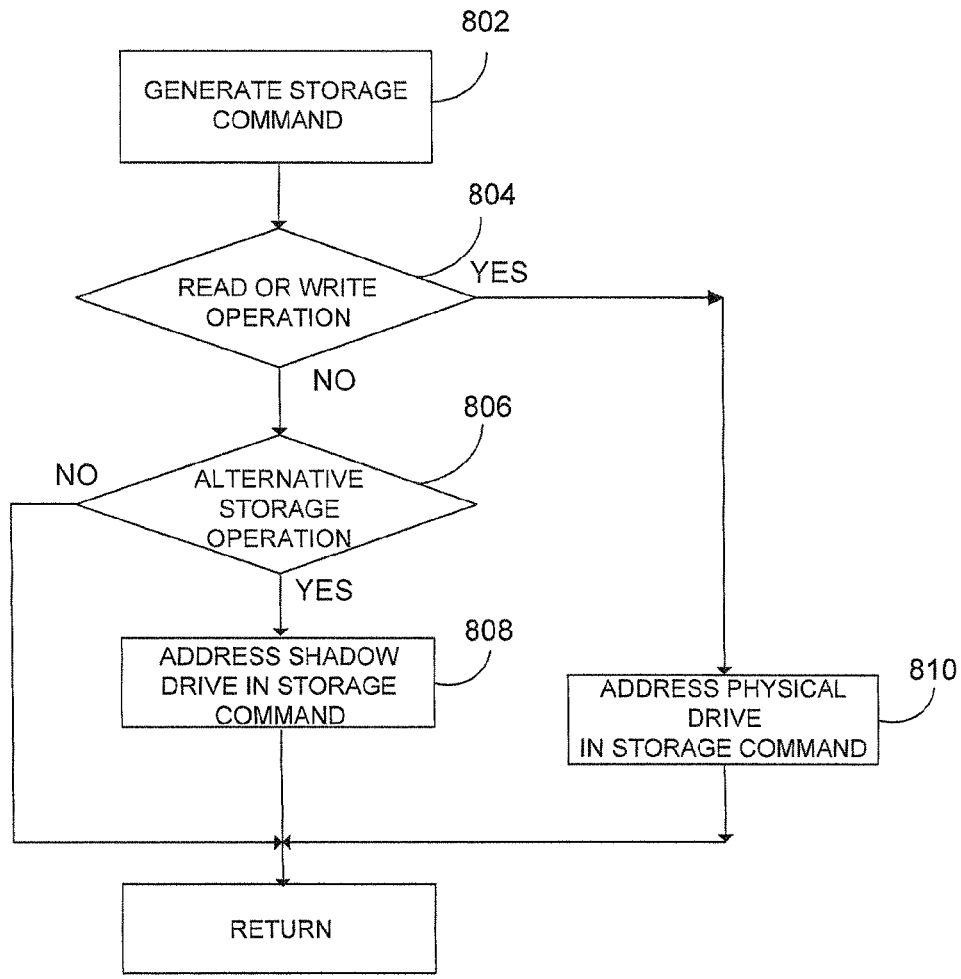
FIG. 5 depicts an example of a process for generating storage commands that reference shadow drives.

Referring to FIG. 5, the initiator 100 is pre-programmed to understand the mapping scheme used by the storage processor 200 for associating the shadow drives 705 with the physical drives 605. In operation 802, the initiator 100 generates a storage command for sending to the storage processor 200. The initiator 100 may want to conduct a conventional read or write in operation 804. The initiator 100 uses the identifier and address of the physical drive 605 associated with the read or write command in operation 810 to either read data from the physical drive 605 or write data to the physical drive 605, respectively. The storage command is sent to the storage processor 200 and the storage processor 200 forwards the read or write command to the identified physical drive 605.

In operation 806, the initiator 100 may want to conduct an alternate storage operation other than a read or write. For example, the initiator 100 may want to invalidate data in a particular address region of a physical drive 605. The initiator 100 in operation 808 generates a shadow write command that includes the identifier of a shadow drive 705 associated with the physical drive 605 containing the data to be invalidated.

For example, the physical drive 605 with the data to be invalidated may have an associated drive identifier of 2 (e.g., physical drive 605B in FIG. 3). The initiator 100 may generate a write command to drive identifier 3 (e.g., shadow drive 705B in FIG. 3). The shadow write command may also include the address and length value for the block of data for invalidating in the physical drive 605B. Initiator 200 in operation 808 sends the shadow write command to the storage processor 200.

Figure 6:
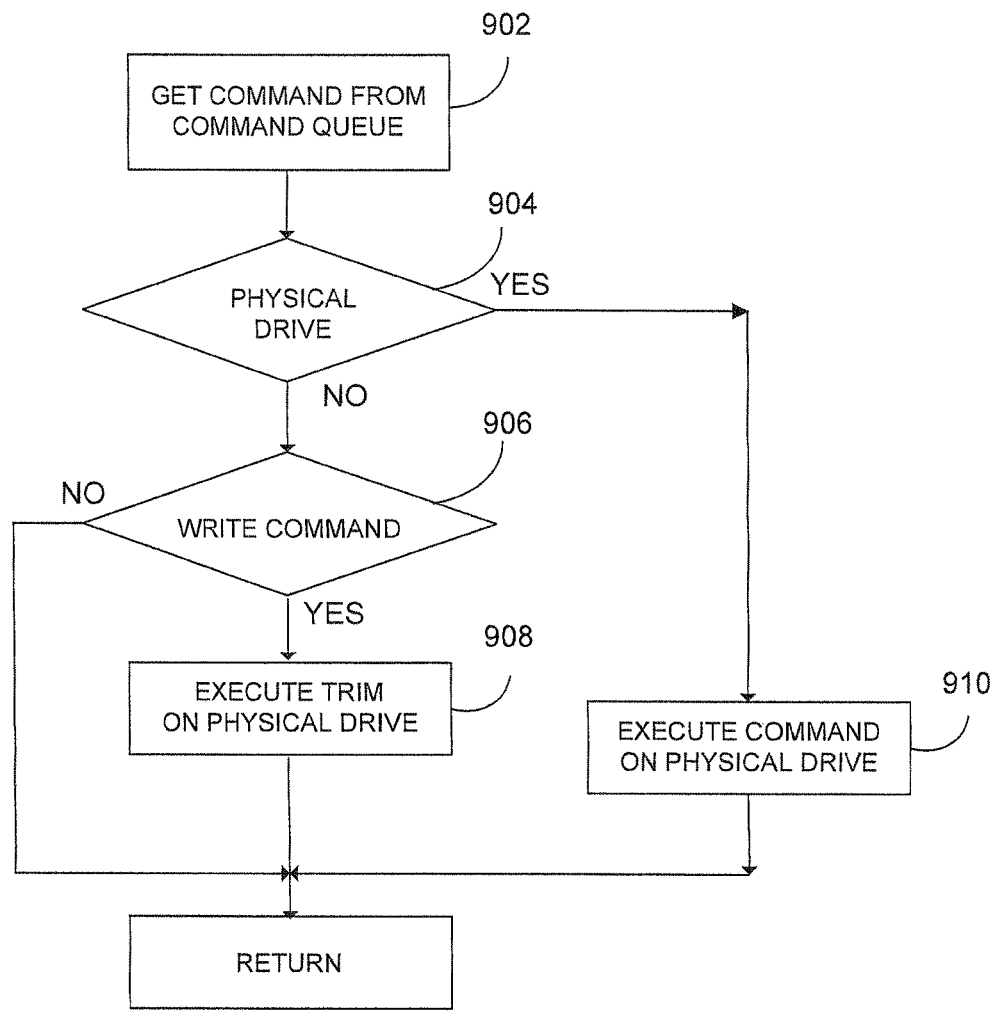
FIG. 6 depicts an example of a process for processing storage commands that reference shadow drives.

FIG. 6 is a flow diagram showing how the storage processor 200 processes the storage commands received from initiator 100. In operation 902, the storage processor 200 obtains a next command from the command queue 300 in FIG. 2. In operation 904, the storage processor 200 determines if the storage command is directed to a physical drive 605 or a shadow drive 705. When the storage command is directed to a physical drive 605, the storage processor 200 initiates a conventional read or write operation, or whatever other operation is identified in the storage command, to the identified physical drive in operation 910.

When the storage command is directed to a shadow drive in operation 904, the storage processor 200 determines if the command is a write command or a read command in operation 906. When the storage command is a write operation to a shadow drive, the storage processor 200 in operation 908 initiates a trim command to the associated physical drive 605. For example, the storage processor 200 will identify the physical drive 605 associated with the shadow drive 705 identified in the storage command 705. The storage processor 200 will then send a trim command in the identified physical drive 605 that invalidates the data at the address identified in the write command.

As mentioned above the storage processor 200 may operate as a proxy device between the initiator 100 and target 400 and use the disk drives 600 in FIG. 1 as a cache or tiering media to store copies of data from disk drives 500. In the storage proxy example, the storage processor 200 may initiate at least some trim commands independently of the storage commands received from the initiator 100. For example, the storage processor 200 may periodically invalidate the least used 40 gigabytes of data in the disk drives 600 so that the disk drives 600 can perform faster indirection operations and maintain faster read and write access to the cache data or tiering media 600. Preserving a large scratch space may also prevent having to periodically reset the tiering or cache media 600.

By using read and write operations to invalidate data, the storage processor 200 provides the physical drive with more scratch memory space for redirection and other maintenance operations. For example, the physical drive will have more space for reassembling disjoined blocks of data into a contiguous address block. These reassembled blocks can then be accessed more quickly by the initiator 100.

The shadow drives 705 also allow the initiator 100 to execute alternative storage operations, such as trim operations, that are not supported in some storage systems. For example, the trim operation can be initiated in a storage system that can only send read and write commands.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the commands. Some of the commands described above may be implemented in software or firmware and other commands may be implemented in hardware.

For the sake of convenience, the commands are described as various interconnected functional blocks or distinct software modules. This is not necessary, however, and there may be cases where these functional blocks or modules are equivalently aggregated into a single logic device, program or command with unclear boundaries. In any event, the functional blocks and software modules or features of the flexible interface can be implemented by themselves, or in combination with other commands in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. An apparatus, comprising:
 a processor configured to receive a storage command to perform a storage operation; and
 perform a first storage operation identified in the storage command on a physical storage drive when the received storage command is associated with the physical storage drive; and
 perform a second storage operation on the physical storage drive when the received storage command is associated with a shadow storage drive.

2. The apparatus of claim 1, wherein the shadow storage drive is a plurality of shadow storage drives and physical storage drive is a plurality of physical storage drives having assigned drive numbers and a shadow storage drive number is associated with a physical drive number.

3. The apparatus of claim 1, wherein when the storage command associated with the physical drive is a write operation the processor is configured to initiate the write operation in the physical storage drive; and, when the storage command associated with the shadow storage drive is a write operation, the processor is configured to initiate a trim operation in the physical storage drive.

4. The apparatus of claim 1, wherein the storage command to the physical storage drive is a read operation and the processor is configured to initiate the read operation in the physical storage drive.

5. The apparatus of claim 4, wherein the storage command comprises a read operation to the shadow drive the processor is performs no op.

6. The apparatus of claim 1, wherein the processor is configured to:
 receive a storage drive inquiry;
 identify a group of physical storage drives in response to the storage drive inquiry; and
 identify a group of shadow drives that are logically associated with the group of physical storage drives in response to the storage drive inquiry, wherein a shadow drive of the group of shadow drives is referenced by the storage command to initiate operations other than a read or a operation to a physical storage drive of the group of physical storage drives.

7. The apparatus of claim 1, wherein the first storage operation is a read operation or a write operation, and the second storage operation is neither a read operation nor a write operation.

8. A method, comprising:
providing a circuit having logic configured to perform the steps of:
receiving a storage command associated with one of a physical storage device or a shadow storage device; and
initiating a storage operation to the physical device such that:
when the received storage command is associated with the physical storage device, a first storage operation to the physical storage device is initiated; or
when the received storage command is associated with the shadow storage device, a second storage operation on the physical storage device is initiated.

9. The method of claim 8, wherein the second storage operation is not supported by a system used for issuing the storage command.

10. The method of claim 9, wherein the second storage operation invalidates an address space in the physical storage device.

11. The method of claim 8, further comprising:
receiving the storage command for a write operation to the physical storage device causes the circuit to initiate a write operation in the physical storage device; and
receiving the storage command for the write operation to the shadow storage device causes the circuit to initiate a trim operation in the physical storage device.

12. The method of claim 8, further comprising:
directing a receive storage command for a read operation to the physical storage device to initiate a read operation in the physical storage device; and
directing the received storage command for a read operation to the shadow storage device to initiate an administration operation or a no-op in the first physical storage device.

13. The method of claim 8, further comprising:
directing the received storage command for a read or write operation to the physical storage device to initiate a read or write operation in the physical storage device; and
directing the received storage command for the read or write operation to the shadow storage device to initiate a pre-fetch operation to the physical storage device.

14. A storage processor, comprising:
a command queue coupled between an initiator and a storage device, configured to receive storage commands from the initiator;
logic circuitry configured to:
identify a physical storage device coupled to the storage processor and create a shadow storage device associated with the physical storage device in response to a storage device query from the initiator;
receive a storage command in the command queue from the initiator,
wherein the storage command includes an address and a storage device identifier;
initiate a first storage operation associated with the address to the physical storage device when the storage device identifier is associated with the physical storage device; and
initiate a second storage operation associated with the address to the physical storage device when the storage device identifier is associated with the shadow drive.

15. The storage processor of claim 14, wherein the initiator is not configured to issue the storage command to initiate the second storage operation.

16. The storage processor of claim 14, wherein the first storage operation is a write operation and the second storage operation is a trim operation.

17. storage processor of claim 14, wherein the first storage operation is a read operation and the second storage operation is a no-op.

18. The storage processor of claim 14, wherein the second storage operation invalidates data in the physical storage device and the logic circuitry is further configured to issue the second storage operation independently of the initiator.

19. The storage processor of claim 14, wherein the physical storage device is a plurality of disks.

20. The storage processor of claim 14, wherein the physical storage device is a plurality of solid state drives (SSD).

21. The storage processor of claim 14, wherein the logic circuitry is a processor configured by a software program product stored on a non-transient computer readable medium.

22. The storage processor of claim 14, further comprising a first physical storage device, and in communication with a second physical storage device,
wherein the second storage operation invalidates data in the first physical storage device and the logic circuitry is further configured to issue the second storage operation independently of the initiator to a least used data block in the first physical storage device.

* * * * *

UNITED STATES PATENT AND TRADEMARK OFFICE
CERTIFICATE OF CORRECTION

PATENT NO. : 8,635,416 B1
APPLICATION NO. : 13/039162
DATED : January 21, 2014
INVENTOR(S) : Erik de la Iglesia Page 1 of 1

It is certified that error appears in the above-identified patent and that said Letters Patent is hereby corrected as shown below:

<u>In the Claims</u>

In column 8, claim 5, line 59, replace "is performs no op." with --performs a no-op.--.

In column 9, claim 6, line 3, after "than a read or" replace "a" with --an--.

In column 10, claim 17, line 27, before "storage processor of" insert --The--.

Signed and Sealed this
Nineteenth Day of August, 2014

Michelle K. Lee
*Deputy Director of the United States Patent and Trademark Office*